No. 778,403. PATENTED DEC. 27, 1904.
W. B. CLINE.
PHOTOGRAPHIC FILM CARTRIDGE.
APPLICATION FILED JAN. 12, 1903.
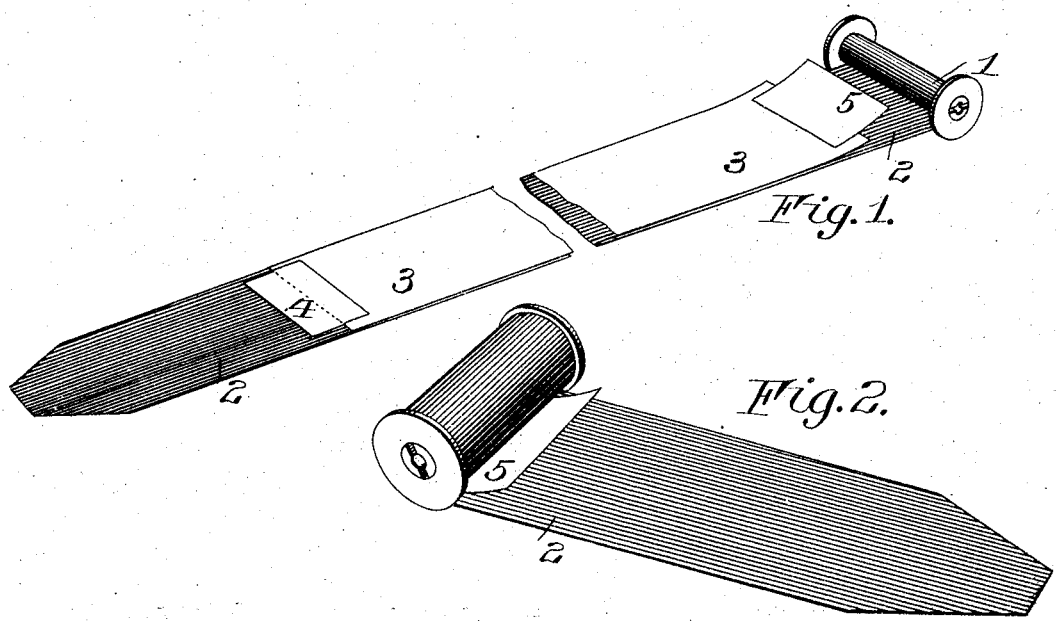
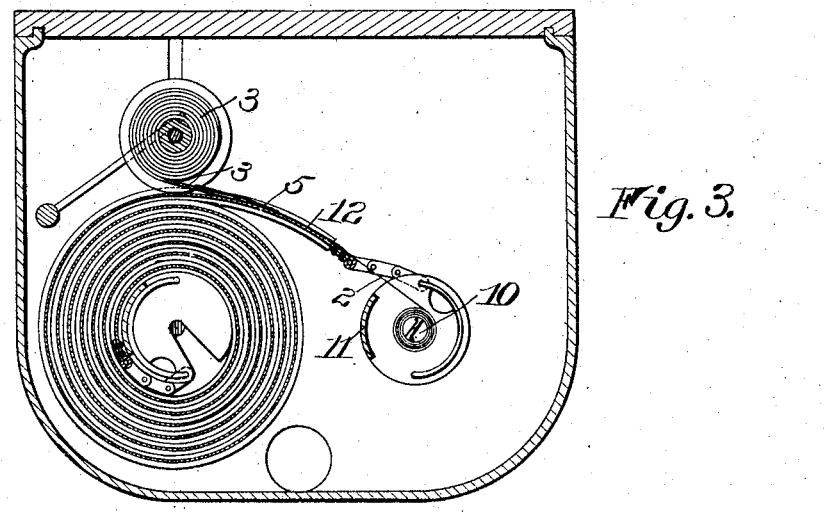

No. 778,403.

Patented December 27, 1904.

UNITED STATES PATENT OFFICE.

WILLIAM B. CLINE, OF ROCHESTER, NEW YORK, ASSIGNOR, BY MESNE ASSIGNMENTS, TO EASTMAN KODAK COMPANY, OF ROCHESTER, NEW YORK, A CORPORATION OF NEW YORK.

PHOTOGRAPHIC-FILM CARTRIDGE.

SPECIFICATION forming part of Letters Patent No. 778,403, dated December 27, 1904.

Application filed January 12, 1903. Serial No. 138,631.

*To all whom it may concern:*

Be it known that I, WILLIAM B. CLINE, of Rochester, in the county of Monroe and State of New York, have invented certain new and useful Improvements in Photographic-Film Cartridges; and I do hereby declare the following to be a full, clear, and exact description of the same, reference being had to the accompanying drawings, forming a part of this specification, and to the reference-numerals marked thereon.

My present invention relates to photographic-film cartridges such as described in Patent No. 539,713, granted May 21, 1895, to Turner, and adapted for use in roll-holders and cameras and embodying generally a strip of photographic film and an enveloping strip of opaque paper, to which only one end of the film is connected, and has for its object to render such cartridges capable of being readily used in film-developing machines of that class shown in United States Letters Patent No. 707,791, granted August 26, 1902, to A. W. McCurdy. In the Turner cartridges the film is attached to the enveloping paper near the forward end only—that is to say, at the end which is at the outer side of the coil or roll when wound upon the spool and ready for exposure—while the rear end is unattached, and when, therefore, the film and paper cover has been wound onto a receiving spool or reel after being exposed in a camera there is no means provided by which the film can be drawn off the spool by tension on the free outer end of the paper. In the use of the developing-machines of the class shown in the McCurdy patent in connection with film-cartridges it is desirable to draw off a portion of the end of the paper upon the reel before the film and paper are received upon the apron, and as the end of the film last exposed must be connected to the paper at this time, though not during manipulation in the camera, in order that it may be drawn forward by tension on the paper and properly positioned upon the apron, I find this is best accomplished by securing to the free end of the film forming part of the cartridge a leading-strip, which after the exposure of the film in a holder may be attached to the covering paper, permitting the latter to draw and properly lay the film on the sustaining-apron during its manipulation in the developing and fixing solutions, as will be presently described.

In the drawings, Figure 1 is a perspective view of my improved film-cartridge with the film and cover unrolled; Fig. 2, a perspective view of an exposed cartridge with a portion of the cover-strip unwound, showing the leading-strip; Fig. 3, a diagrammatic sectional view of a portion of a developing-machine, showing the manner of using my improved cartridge.

Similar reference-numerals in the three figures indicate similar parts.

1 indicates the usual spool or spindle forming the base or support of the cartridge; 2, the strip of opaque covering paper; 3, the strip of photographic film shorter than the paper and secured to the latter at the forward or drawing end only by the securing-piece 4 or otherwise. The rear end of the film is not permanently connected to the strip 2 in order that wrinkling of the film or paper is prevented when being wound forward in the camera or roll-holder; but I secure to said rear end a piece of light flexible material, such as paper, (indicated by 5,) which may be readily attached to the covering paper by the operator when the film is to be moved by drawing upon the rear end of said covering, as in the developing-machine. This attaching-strip 5 is preferably of strong paper having the under side of its free end covered with a coating of dried adhesive material, such as gum or cement, which may be moistened by the operator and pressed down on the paper 2 to secure it and which will not injuriously affect nor be affected by the developing and fixing solutions. It is desirable that the strip 5 be long enough to project a sufficient distance from the rolled cartridge to enable the operator to secure it to the paper in daylight, as shown in Fig. 2, without unrolling and exposing the film. In Fig. 3 is shown the manner of using the cartridge in a daylight developing apparatus of the class before referred to, 10 indicating the spindle to which the front end of the paper covering is to be connected and 11 the reel on which the film-supporting apron 12 is to be wound.

The cartridges are adapted for use in any form of developing apparatus in which the film is unwound from the spool by tension on the covering paper, and the illustration in Fig. 3 is therefore diagrammatic only.

Instead of securing the film to the rear end of the covering paper by dried adhesive material on the strip 5 said material could be arranged on the covering paper or the end of the film secured directly to the covering after exposure, or any other means for accomplishing its ready attachment may be employed; but I find that this is simple and cheap, and as it is only necessary in some forms of developing apparatus to cause the film and paper to be drawn upon the apron properly in the first instance it is immaterial whether or not the film end becomes unfastened by the dissolving of the adhesive material.

I claim as my invention—

1. A photographic-film cartridge embodying a strip of flexible film and a covering strip of opaque flexible material extending beyond the ends of the film and wound with it into a coil, one end of the film being attached to the covering material and a means for connecting the other end of the film to the covering material said means being arranged on one of the parts and capable of ready attachment to the other.

2. A photographic-film cartridge embodying a strip of flexible film and a covering strip of opaque flexible material extending beyond the ends of the film and wound with it into a coil, one end of the film being attached to the covering material and a strip for connecting the other end of the film to the covering material having dried adhesive material thereon and connected to one of the parts.

3. A photographic-film cartridge embodying a strip of flexible film and a covering strip of opaque flexible material extending beyond the ends of the film and wound with it into a coil, one end of the film being attached to the covering material and a strip attached to and extending beyond the other end of the film and adapted for attachment to the covering material.

4. A photographic-film cartridge embodying a strip of flexible film and a covering strip of opaque flexible material extending beyond the ends of the film and wound with it into a coil, one end of the film being connected to the covering material and a strip attached to and extending beyond the other end of the film and provided with dried adhesive material thereon.

5. In a cartridge-film for photographic purposes the combination of a strip of flexible opaque material, a strip of sensitized flexible film superposed upon and attached at one end to the opaque material, and a flap on the normally free end of the film whereby it may be attached to the opaque material.

6. In a cartridge-film for photographic purposes the combination of a strip of flexible opaque material, a strip of sensitized flexible film shorter than the opaque material and superposed on it in such a manner that the opaque material projects beyond the film at both ends, one end of the film being attached to the opaque material, and a flap of paper or cloth attached to the normally free end of the film whereby it may be pinned to the opaque material.

WILLIAM B. CLINE.

Witnesses:
ALICE K. WHITNEY,
FREDERICK F. CHURCH.